United States Patent [19]

Occella et al.

[11] 4,318,377
[45] Mar. 9, 1982

[54] INTERNAL COMBUSTION ENGINE WITH FUEL INJECTION

[75] Inventors: Sergio Occella; Giulio Arietti; Gianpiero Borello, all of Turin, Italy

[73] Assignee: Centro Ricerche Fiat S.p.A., Orbassano, Italy

[21] Appl. No.: 143,389

[22] Filed: Apr. 24, 1980

[30] Foreign Application Priority Data

May 22, 1979 [IT] Italy ................... 68082A/79

[51] Int. Cl.³ ............................................. F02B 17/00
[52] U.S. Cl. ..................... 123/279; 123/280; 123/295; 123/298; 123/305
[58] Field of Search ............. 123/261, 276, 279, 280, 123/289, 294, 295, 298, 301, 305

[56] References Cited

U.S. PATENT DOCUMENTS

| | | | |
|---|---|---|---|
| 1,967,243 | 7/1934 | Hesselman | 123/305 |
| 2,246,019 | 6/1941 | Steinlein | 123/298 X |
| 2,800,118 | 7/1957 | Scherenberg | 123/298 |
| 4,270,498 | 6/1981 | Occella et al. | 123/276 |

FOREIGN PATENT DOCUMENTS 958789 1/1957 Fed. Rep. of Germany ...... 123/294

Primary Examiner—Tony M. Argenbright
Attorney, Agent, or Firm—Sughrue, Mion, Zinn, Macpeak & Seas

[57] ABSTRACT

An internal combustion engine has a fuel injector in a side wall of each cylinder to direct a fuel jet onto a flat or concave impingement surface of a shield projecting into the cylinder from the cylinder head, to atomize the fuel in the vicinity of the sparking plug electrodes with minimal wetting of the cylinder walls and of the plug electrodes. The piston head is formed with an asymmetrically located combustion chamber surrounded by extensive "squish" areas arranged to promote the formation of a fuel vortex in which charge stratification occurs centrifugally.

11 Claims, 12 Drawing Figures

INTERNAL COMBUSTION ENGINE WITH FUEL INJECTION

The present invention relates to internal combustion engines with spark ignition and with fuel injection into each cylinder, in which the combustion chamber volume is formed predominantly in the associated piston.

In particular, the invention relates to engines of the type specified above operating with stratified charge, that is, with a non-homogenous fuel-air mixture in each cylinder, having a concentration which varies from one point to another within the combustion chamber, being richer in the zone of the combustion chamber surrounding the sparking plug. Known stratified charge engines of this type make it possible to reduce fuel consumption at low loads, that is when the torque developed by the engine is low, and to reduce atmospheric pollution by controlling the emission of carbon monoxide and nitrogen oxides in the engine exhaust gases at low and medium engine loads.

Such known engines also afford the possibility of using fuels having a reduced anti-knock rating, which are therefore more economical and less polluting, due to the fact that the non-homogenous fuel mixture of the stratified charge has a low overall concentration, corresponding to a weak mixture, which is such that auto-ignition does not occur.

Previously known stratified charge engines, however, present a problem in that the specific power obtainable is somewhat limited and the fuel consumption and discharge of carbon monoxide at full load are considerable. This is due to the fact that the process of formation of the stratified charge is not sufficiently controllable and results in excessive enrichment of the mixture when the engine is running at full load. Furthermore, the need to achieve and maintain charge stratification until the moment of ignition makes it difficult to achieve rapid mixing of the combustion products from the rich mixture concentration zone of the combustion chamber with those from the remaining, weak mixture concentration zone.

The object of the present invention is to provide an internal combustion engine with spark ignition and with fuel injection into each cylinder, which is not subject to the difficulties referred to above, and which makes it possible to obtain different degrees of charge stratification which are controllable as a function of the speed of and the load on the engine.

According to the present invention there is provided an internal combustion engine with spark ignition in which the cylinders are covered by a cylinder head and each cylinder is provided with a fuel injector and a sparking plug, the combustion chamber volume of each cylinder being formed predominantly in the associated piston, characterised in that:

the fuel injector is situated in the side wall of the cylinder adjacent the cylinder head;

the portion of combustion chamber formed in the piston is concentrated in one part of the crown of the piston so as to form extensive "squish" areas between the cooperating surfaces of the piston and the cylinder head;

the cylinder head is provided with a shield projecting substantially in the axial direction within the cylinder on the side thereof opposite the injector and positioned adjacent the electrodes of the sparking plug, the said shield having an impingement surface facing towards the fuel injector, and the fuel injector is arranged to direct a single compact jet of fuel, at a substantially zero angle of divergence, substantially perpendicularly to the said impingement surface, so that the impingement of the fuel jet on the said impingement surface causes fine atomization of the fuel in the region of the cylinder adjacent the electrodes of the sparking plug.

The invention will be further described, by way of non-limiting example, with reference to the accompanying drawings, in which.

Figure 1:
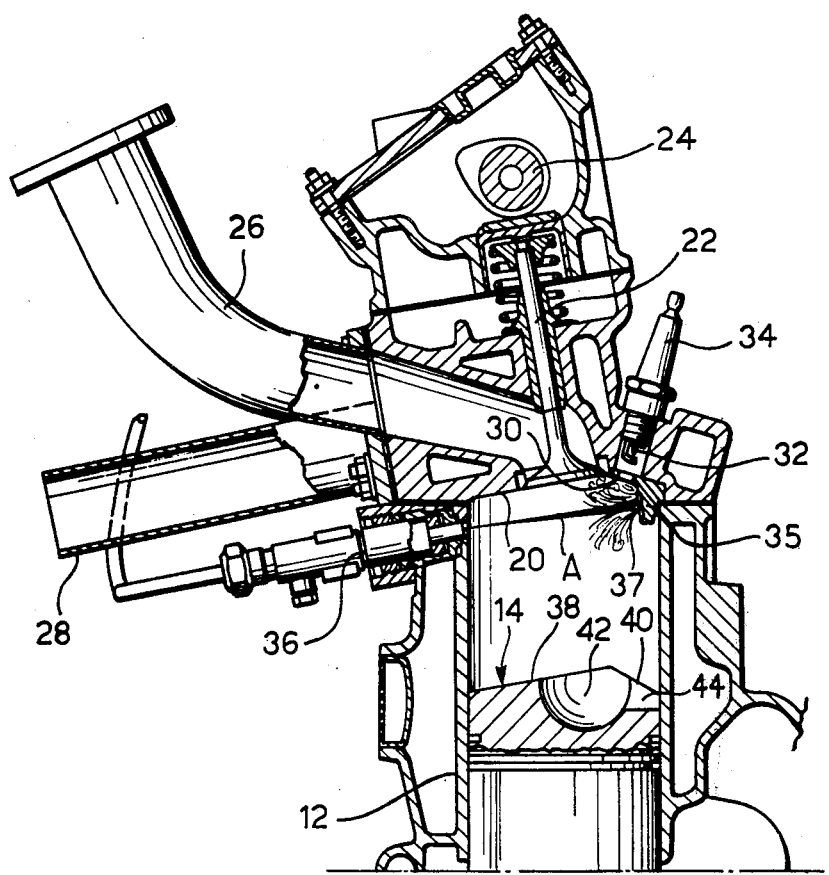
FIG. 1 is a partially cut-away transverse sectional view of an engine according to the invention during the compression phase.
Figure 2:
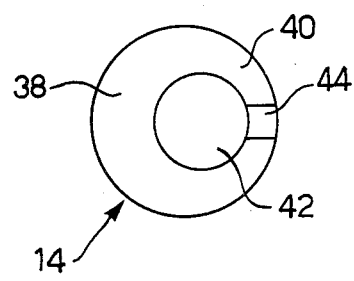
FIG. 2 is a plan view of one of the pistons of the engine shown in FIG. 1.
Figure 3:
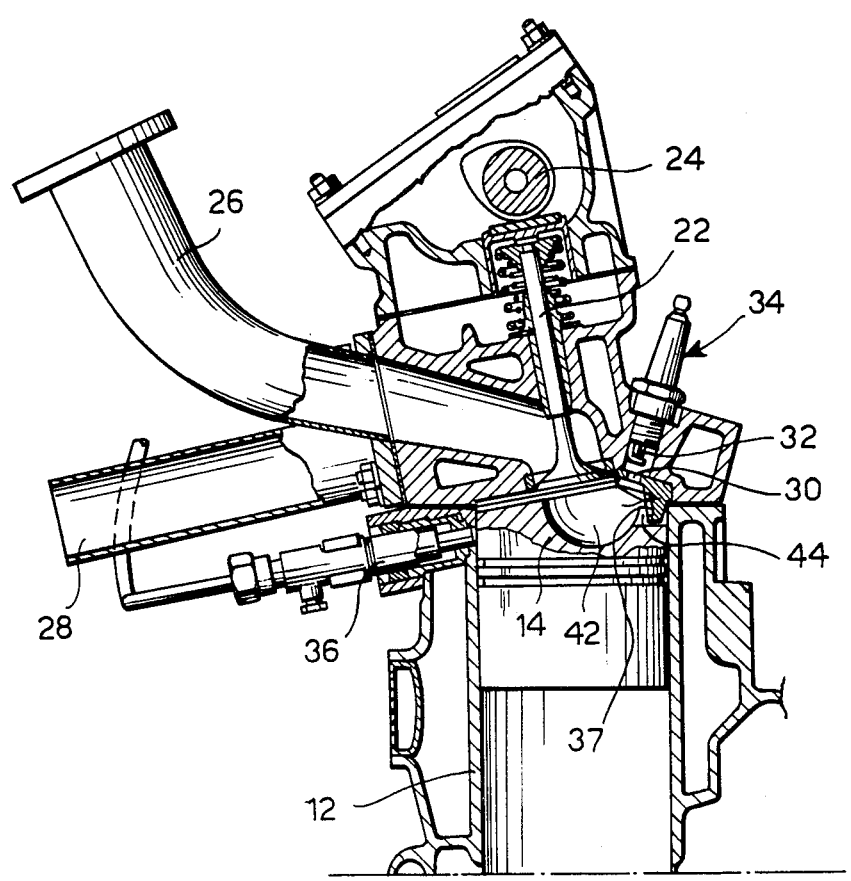
FIG. 3 is a view similar to FIG. 1 during the combustion phase.

Referring to FIGS. 1 to 3, a cylinder of an Otto cycle internal combustion engine is indicated generally by reference numeral 12. A piston 14 is slidable fluid-tightly in the cylinder 12 and is pivotally connected on its underside, by means of a gudgeon pin (not shown), to the stem of a connecting rod (not shown) in a known manner.

The cylinder 12 is closed by a head 20 which carries for each cylinder an inlet valve 22 and an exhaust valve (not shown). The inlet valve 22 and the exhaust valve are operated by a common overhead camshaft 24, opening of the inlet valve 22 allowing air to enter the cylinder 12 through an inlet duct 26 and opening of the exhaust valve allowing the discharge of the combustion gases from the cylinder 12 through an exhaust duct 28.

The cylinder head 20 is provided with a lateral bore 30 the axis of which is directed into the cylinder 12 towards the axis of the latter and in which the electrodes 32 of a sparking plug 34 are situated. A shield 35 is carried by the head 20 adjacent the bore 30 and projects substantially in the axial direction into the cylinder 12. The shield 35, which is located between the side wall of the cylinder 12 and the bore 30, has an impingement surface 37, the function of which will be described later, facing towards a fuel injector 36 located in the side wall of the cylinder 12 close to the head 20, opposite the shield 35.

The fuel injector 36 is connected to a fuel injection pump (not shown) and is preferably of the single-orifice type or of the "pintle nozzle" type. The injector directs a single compact jet of fuel, indicated by A, of substantially zero angle of divergence and with a strong penetration even at small engine loads, substantially orthogonally to the impingement surface 37. In the case where the injector 36 is of the single orifice type, the diameter of its orifice would typically be between 0.2 mm and 0.3 mm, for engines having a capacity of approximately 500 $cm^3$ per cylinder.

As is shown in FIG. 1, the crown of the piston 14 is roof-shaped and has a major face 38, which faces towards the fuel injector 36, and which is parallel to the cooperating surface of the cylinder head 20. The piston crown also has a minor face 40, of smaller surface area than the face 38.

The crown of the piston 14 is further formed with a substantially hemispherical cavity 42 intended to form a combustion chamber, when the piston 14 is in its top dead-centre position in the cylinder 12. The centre of the cavity 42 is displaced, with respect to the geometrical centre of the piston crown, towards the shield 35. The cavity 42 lies predominantly in one part of the top of the piston 14 so as to cause, during the running of the engine, extensive areas of compression, called "squish" areas between the upper surfaces of the piston 14 and the cylinder head 20.

The squish areas, between the cooperating surfaces of the cylinder head 20 and of the piston 14 are practically free from fuel. This leads to a considerable reduction in the phenomenon of "detonation" or pre-ignition in the running of the engine.

The cavity 42 communicates laterally with a radial recess 44 which is aligned with the shield 35 and which accommodates the latter in the top-dead-centre position of the piston 14, shown in FIG. 3.

Figure 4:
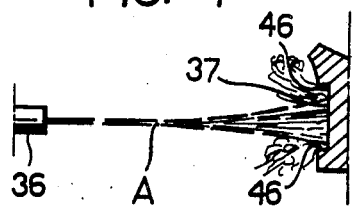
FIG. 4 is a partially sectioned diagrammatic view on an enlarged scale of an injector and associated impingement surface employed in the engine shown in FIGS. 1 and 3, and FIGS. 5 to 12 show eight variants of FIG. 4.
Figure 9:
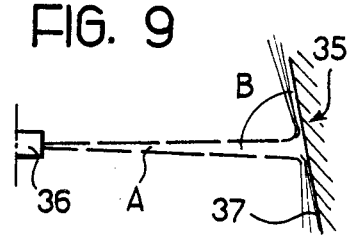

The impingement surface 37 of the shield 35, shown in detail in FIG. 4, is flat and delimited by upper and lower projecting lips 46 adapted to prevent, during the fuel injection phase, the direct entry of the injected fuel into the bore 30 containing the electrodes 32 of the sparking plug 34.

In operation of the engine fuel is injected into each cylinder during the compression phase (FIG. 1) at relatively high injection pressures and speeds. The degree of charge stratification which occurs as a function of the engine load may be regulated by varying the timing of the fuel injection. The impingement of the jet A of fuel against the surface 37 of the shield 35 causes a fine atomization of the fuel in the region of the cylinder 12 in front of the electrodes 32 of the sparking plug 34. The fuel, entrained by the air during the compression phase, reaches the plug electrodes 32 in a finely atomized state or in vapour phase, rather than in a liquid jet form.

The shield 35 therefore effectively prevents both the wetting of the surface of the cylinder 12 opposite the injector 36, and the wetting of the electrodes 32 of the sparkig plug 34.

As the piston 14 moves towards its top-dead-centre position (FIG. 3) it generates in the cylinder 12 a cylindrical vortex about a horizontal axis. The outer peripheral part of this vortex will be relatively rich in fuel, due to the asymmetric position and the shape of the cavity 42 in the crown of the piston 14 and to the extensive "squish" areas between the crown of the piston 14 and the cylinder head 20.

During the combustion phase, the ignition of the fuel-air mixture occurs first in correspondence with the periphery of the said horizontal vortex, and spreads rapidly towards the internal zones of the vortex where the fuel-air mixture is relatively lean. Since these internal zones of the vortex are cooler and therefore more dense than the peripheral zones, they have a tendency to become centrifuged and therefore follow a centripetal spiral path which ensures rapid combustion of the lean mixture. This assists in inhibiting the emission of oxides of carbon in the exhaust gases improves the speed of combustion, and reduces the loss of efficiency. The emission of unburnt hydrocarbons is also effectively inhibited due to the fact that the weak mixture at the centre of the fuel vortex is not in contact with the walls of the cavity 42 which acts as the combustion chamber.

It will be noted that a similar distribution of fuel in the combustion chamber within the cylinder 12 could also be achieved by injecting the fuel so as to wet the surfaces of the piston cavity 42. With such an arrangement, however, the timing of the injection should be much earlier in the induction phase in order to allow complete evaporation of all the fuel prior to ignition. This in turn would make it more difficult to control pre-ignition or "detonation" due to the evaporation early in the compression stroke of the more volatile primary fractions of the injected charge. Consequently, it would not be possible to employ, and to exploit the advantages of, high compression ratios, which include improved specific fuel consumption, the possibility of running the engine with weak mixture, and control of the emission of noxious exhaust gases, By adopting the arrangement of the present invention, however, fine atomization is achieved by the impingement of the jet of fuel A at high energy against the impingement surface 37 of the shield 35, allowing a more rapid and simultaneous evaporation of all the fuel injected. It is therefore possible on the one hand to reduce the injection advance, and on the other hand to improve the control of detonation, engine exhaust fumes and of pre-ignition.

Figure 5:
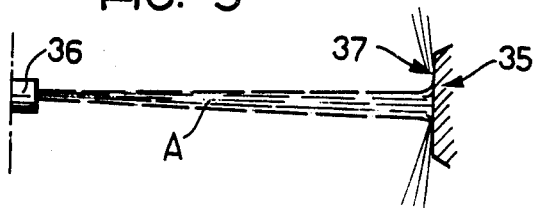
Figure 6:
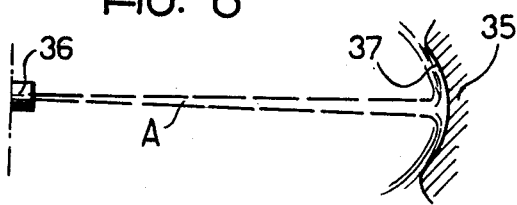
Figure 7:
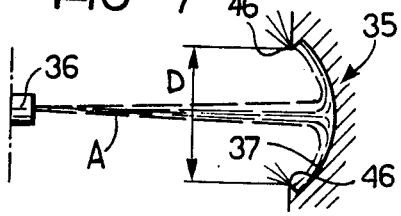
Figure 11:
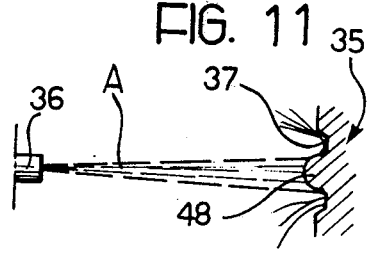
Figure 8:
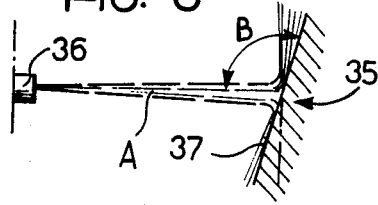
Figure 12:
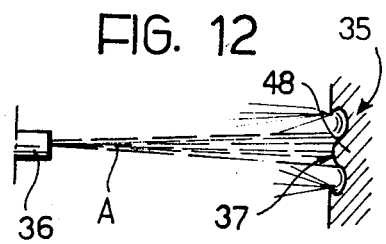

In FIGS. 5 to 12 some variants of the impingement surface 37 of the shield 35 are shown. The impingement surface 37 may be flat (FIG. 5) or concave, with spherical or cylindrical curvature (FIG. 6). The surface 37 may be devoid of projecting lips 46, as shown in FIGS. 5 and 6. In the case where the impingement surface 37 is flat or cylindrical, the angle B facing the cylinder head 20 between the axis A of the jet of fuel and this impingement surface 37 (FIGS. 8 and 9) may be different from 90° for example, between 60° and 100°. In this case it is possible to displace the zone in which the mixture is formed, and, as a result, the fuel distribution within the cavity 42 forming the combustion chamber 42.

In the case where the impingement surface 37 is cylindrical with a horizontal axis, and is provided with edge lips 46 (FIG. 7), the width D of the surface between the lips 46 is preferably between 10 and 20 mm, for engines with a capacity between 300 and 500 cm$^3$ per cylinder.

Figure 10:
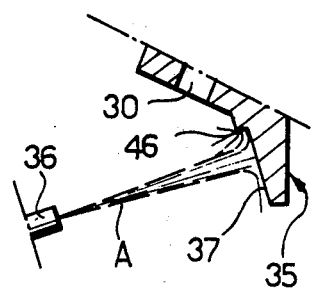

The impingement surface 37 may be provided with a single projection 46 arranged on the part of the surface adjoining the sparking plug 34 and in order to prevent the direct entry of the jet of fuel A into the bore 30 (FIG. 10). In this case, the impingement surface 37 may be inclined to the axis of the cylinder 12 so as to be spaced at progressively increasing distances from the axis of the cylinder 12 from the end of the surface 37 which adjoins the sparking plug 34. The projection 46 may alternatively comprise an annular flange or lip with a circular shape having its centre substantially coinciding with the axis of the fuel jet A.

The impingement surface 37 may furthermore have, both in the case where it is flat (FIG. 11) and in the case where it is cylindrical (FIG. 12), a surface conformation designed to facilitate the automization of the fuel. In this case, the impingement surface 37 may have a surface roughness or protrusions 48 directed towards the fuel jet A.

It will be understood that details of construction and of practical embodiments of the invention may be varied extensively with respect to what has been described and illustrated, without thereby departing from the scope of the present invention.

We claim:

1. Internal combustion engine with spark ignition having pistons slidable in respective cylinders, a cylinder head covering the cylinders, and, associated with each cylinder, a fuel injector and a sparking plug, each cylinder containing a combustion chamber the volume of which is formed predominantly in the associated piston, wherein:

- each fuel injector is situated in the side wall of the associated cylinder adjacent the cylinder head;
- the portion of each combustion chamber formed in the piston is concentrated in one part of the surface of the piston so as to form extensive squish areas between the cooperating surfaces of the piston and the cylinder head;
- the cylinder head is provided, for each cylinder, with a respective shield projecting substantially in the axial direction within the cylinder on the side thereof opposite the associated injector and positioned adjacent the electrodes of the respective sparking plug, the said shield having an impingement surface facing towards the fuel injector, and
- each fuel injector is arranged to direct a single compact jet of fuel, at a substantially zero angle of divergence, onto and substantially perpendicularly to said impingement surface of the said shield to cause fine atomization of the fuel in the region of the cylinder adjacent the sparking plug electrodes.

2. An engine as defined in claim 1, wherein the impingement surface of each shield is flat.

3. An engine as defined in claim 1, wherein the impingment surface of each shield is concave.

4. An engine as defined in claim 3, wherein said impingement surface of each shield is substantially spherical.

5. An engine as defined in claim 3, wherein said impingement surface is cylindrical.

6. An engine as defined in claim 2 or claim 5, wherein the angle facing the cylinder head between the axis of the fuel jet and the said impingement surface is between 60° and 100°.

7. An engine as defined in claim 2, wherein the impingement surface is inclined to the axis of the cylinder so as to be spaced at progressively increasing distances from the axis of the cylinder from the end of the said surface which adjoins the sparking plug.

8. An engine as defined in claim 2, wherein the impingement surface has a surface conformation which facilitates the atomization of the fuel.

9. An engine as defined in claim 1, wherein the impingement surface has, at least in correspondence with a region adjoining the electrodes of the sparking plug, a protrusion facing towards the inside of the cylinder.

10. An engine as defined in claim 1, wherein the fuel injector is of the single orifice type.

11. An engine as defined in claim 1, wherein the fuel injector is of the pintle nozzle type.

* * * * *